United States Patent
Zachariassen et al.

(10) Patent No.: US 9,864,685 B2
(45) Date of Patent: Jan. 9, 2018

(54) METHOD AND SYSTEM FOR CACHE TIERING

(75) Inventors: Rayan Zachariassen, Toronto (CA); Steven Lamb, Toronto (CA)

(73) Assignee: INTEL CORPORATION, Santa Clara, CA (US)

(*) Notice: Subject to any disclaimer, the term of this patent is extended or adjusted under 35 U.S.C. 154(b) by 743 days.

(21) Appl. No.: 14/348,588

(22) PCT Filed: Aug. 24, 2011

(86) PCT No.: PCT/CA2011/050515
§ 371 (c)(1),
(2), (4) Date: Apr. 9, 2014

(87) PCT Pub. No.: WO2012/024801
PCT Pub. Date: Mar. 1, 2012

(65) Prior Publication Data
US 2014/0304473 A1    Oct. 9, 2014

Related U.S. Application Data (60) Provisional application No. 61/377,018, filed on Aug. 25, 2010.

(51) Int. Cl.
*G06F 12/08* (2016.01)
*G06F 12/0811* (2016.01)
(Continued)

(52) U.S. Cl.
CPC ...... *G06F 12/0811* (2013.01); *G06F 12/0868* (2013.01); *G06F 12/0897* (2013.01);
(Continued)

(58) Field of Classification Search
CPC ............. G06F 12/0811; G06F 12/0868; G06F 12/0897
See application file for complete search history.

(56) References Cited

U.S. PATENT DOCUMENTS 6,032,224 A * 2/2000 Blumenau ............... G06F 12/08
710/15
7,631,155 B1 * 12/2009 Bono .................... G06F 3/0608
707/999.202
(Continued)

FOREIGN PATENT DOCUMENTS

WO    WO2010/037117    4/2010
WO    WO2010/093108    8/2010
WO    WO-2010/093108   8/2010

OTHER PUBLICATIONS

Gala Yadgar et al: "Karma: Know-it-All Replacement for a Multi-level Cache", Fast ' 07: 5th USENIX Conference on File and Storage Tech., Jan. 1, 2007, 169-184, XP055061215.
(Continued)

*Primary Examiner* — Henry Tsai
*Assistant Examiner* — John Roche
(74) *Attorney, Agent, or Firm* — Blakely, Sokoloff, Taylor & Zafman LLP (57) ABSTRACT

A method and system for storing data for retrieval by an application running on a computer system including providing a tiered caching system including at least one cache tier and a base tier, storing data in at least one of said at least one cache tier and said base tier based on a policy, and presenting an application view of said data to the application by a means to organize data. The invention optionally provides an additional overflow tier, and preferably includes multiple cache tiers.

36 Claims, 8 Drawing Sheets

(51) Int. Cl.
 G06F 12/0897 (2016.01)
 G06F 17/30 (2006.01)
 G06F 12/0868 (2016.01)

(52) U.S. Cl.
 CPC .... G06F 17/3056 (2013.01); G06F 17/30082 (2013.01); G06F 17/30132 (2013.01); *G06F 2212/1024* (2013.01); *G06F 2212/1041* (2013.01); *G06F 2212/1048* (2013.01); *G06F 2212/214* (2013.01); *G06F 2212/222* (2013.01); *G06F 2212/314* (2013.01); *G06F 2212/463* (2013.01)

(56) References Cited

U.S. PATENT DOCUMENTS

| | | | |
|---|---|---|---|
| 2007/0156845 A1* | 7/2007 | Devanneaux | H04L 67/02 709/217 |
| 2010/0180230 A1* | 7/2010 | Bogner | G06F 3/0481 715/810 |
| 2010/0198889 A1* | 8/2010 | Byers | G06F 17/302 707/827 |
| 2011/0145479 A1* | 6/2011 | Talagala | G06F 12/02 711/103 |
| 2011/0302365 A1 | 12/2011 | Yong et al. | |
| 2012/0072656 A1* | 3/2012 | Archak | G06F 17/30132 711/104 |
| 2013/0346672 A1* | 12/2013 | Sengupta | G06F 12/0871 711/103 |

OTHER PUBLICATIONS

Supplementary EP Search Report, EP11819255, dated Dec. 17, 2014, 8 pages.
PCT International Search Report and Written Opinion for PCT/CA2011/050515, dated Dec. 5, 2011 (10 pp.).

\* cited by examiner

FIG. 1

PRIOR ART

METHOD AND SYSTEM FOR CACHE TIERING

This application claims priority from U.S. Provisional Application No. 61/377,018, filed on Aug. 25, 2010, the contents of which are incorporated herein in their entirety by reference.

FIELD OF THE INVENTION

The invention relates generally to computer data storage, and more particularly, to a method and system for providing a tiered cache structure.

BACKGROUND OF THE INVENTION

Figure 1:
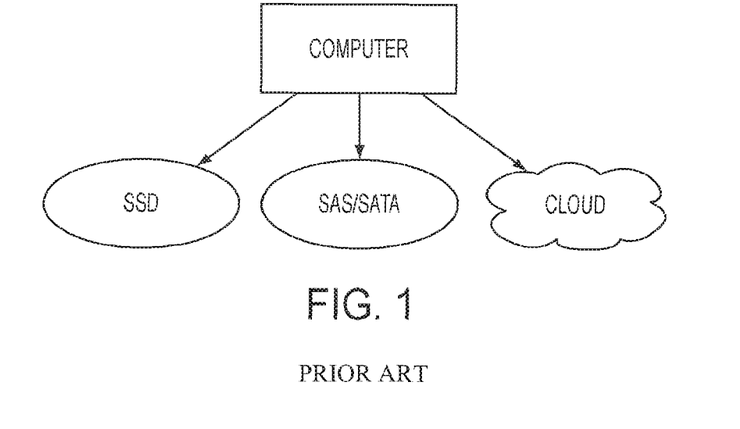
FIG. 1 shows a prior art storage model of a computer where each storage resource or data storage system is separate both in terms of management and the interconnected data flow.

Two specific new classes of storage devices have recently emerged as commodity storage devices that are becoming widely available and easily accessible: flash memory based Solid State Drives (SSDs), and cloud storage. Each of these is known in the art to be clearly differentiated in performance, and cost, from the rotating media hard disk drives prevalent for many years in computer storage systems. Each category of storage devices has its own particular strengths from a pure data storage perspective; for example, SSDs are fast, regular hard drives are cheap, and cloud storage is flexible. As currently used, different storage devices are accessible by a given computer system and interaction with that storage device is managed using distinct data flows. FIG. 1 illustrates a typical prior art system interacting with multiple classes of storage devices.

The differences in characteristics, performance, and cost between the different classes of storage devices are generally greater than the differences between various products or technologies within each class. As a result it is desirable to be able to manage data storage using all categories of storage devices as appropriate to make best use of each of their strengths. There is currently an emerging trend in the art to having SSDs act as caches for regular hard drives in storage systems, although the method of implementation is primitive and is designed on a per system basis with a simplified data flow between the regular hard drive and the SSD.

For some years now the idea of tiering—placing data on separate storage devices based on policy applied to the data—has been used to achieve business goals around data management, for example for cost efficiency, data retention, or regulatory compliance. For example all data might be archived, sensitive data might be encrypted, frequently used data might be kept near its users, etc. This kind of tiering used to be primarily differentiated by the storage devices or data storage systems used for the tiers.

The current solutions in the field of the invention are generally network based (appliances or Storage Area Networks) using block based caching and/or a fixed list of storage device (or storage service, in the case of Cloud Storage) options, such as that shown in FIG. 1.

While the prior art systems make use of the advantages of particular classes of storage devices, they are limited in their use by the interactions between the computer system and the specific storage device. Furthermore, at the application level, accommodations must often be made for data retrieval from different classes of storage devices. Furthermore, little, if any synergistic effects are realized from the different advantages of the different storage device classes, and thus, the prior art systems are limited to the physical manifestations of the storage devices as they would perform independently, irrespective of other different classes of storage devices in the system.

It is therefore an object of the invention to provide a novel system and method for providing a tiered cache structure to achieve benefits resulting from advantages of different classes of storage devices above those that could be realized in using these different classes of storage devices independently.

SUMMARY OF THE INVENTION

The invention provides a novel system and method to transparently integrate different classes of storage devices within a single means to organize data to thereby realize synergistic benefits to the use of these different classes of storage devices that extend beyond the advantages of each class of storage device operating independently, and with each its own means to organize data. The invention provides a generalized caching system and method that can cache any class of storage device on any other class of storage device, and optionally provide such caching in an integrated manner among multiple classes and types of storage devices.

According to one embodiment of the invention, there is provided a method for storing data for retrieval by an application running on a computer system including providing a tiered caching system including at least one cache tier and a base tier, storing data in at least one of the cache tier and the base tier based on a policy, and presenting an application view of the data to the application by a means to organize data. Preferably, the means to organize data includes metadata information for each of at least one cache tier the base tier. Additionally, each of the at least one cache tier and the base tier are arranged on different storage resources and the means to organize data includes metadata information for each of the different storage resources.

According to one aspect of the invention, the method includes providing at least one overflow tier, wherein the overflow tier is arranged on a different storage resource than each of the at least one cache tier and the base tier; and wherein the means to organize data includes metadata information for the overflow tier.

According to another aspect of the invention, the at least one cache tier comprises a plurality of tiered cache tiers. The at least one cache tier may be an operating system file buffer cache, used in conjunction with the operating system.

According to another aspect of the invention, the plurality of cache tiers are each provided on a solid state drive, the base tier is provided on a hard disk drive, and the overflow tier is provided on a cloud storage resource.

According to another aspect of the invention, the means to organize data is stored on the hard disk drive.

According to another aspect of the invention, the method further includes storing the data on the base tier and caching the data on one or more of the plurality of cache tiers, wherein a higher level cache tier caches data on a lower level cache tier.

According to another aspect of the invention, each cache tier level comprises two or more storage resources.

According to another aspect of the invention, the means to organize data is agnostic to the particular storage devices being used.

According to another aspect of the invention, the step of intercepting means to organize data operations to be carried out, or otherwise processed independently of the means to organize data by an intercepting system.

According to another aspect of the invention, the method further includes the step of dissociating input/output operations according to the policy such that at least a portion of the operations are intercepted by the intercepting system and processed according to the policy.

According to another aspect of the invention, the policy is provided by a policy module.

According to another aspect of the invention, the policy module is integral with the intercepting system.

According to another aspect of the invention, the policy module is integral with the means to organize data.

According to another aspect of the invention, the step of intercepting further comprises one of (a) passing an intercepted operation to a data transformation engine provided between a storage resource and the intercepting system; (b) logging the completion of an intercepted operation; and (c) changing an intercepted operation and passing it on to the means to organize data.

According to another aspect of the invention, the method further includes providing a data transformation engine between the intercepting system and the storage resources.

According to another aspect of the invention, the method further includes the step of executing policy outside of the means to organize data; the step of executing policy being carried out by the data transformation engine.

According to another aspect of the invention, the data transformation engine further comprises a read caching module for executing a read operation to find the highest cache tier on which data exists and to retrieve the data.

According to another aspect of the invention, the data transformation engine further comprises a write caching module for performing write operations to different cache tier levels.

According to another aspect of the invention, the data transformation engine further comprises an encryption module for encrypting and decrypting data prior to the data passing through the means to organize data.

According to another aspect of the invention, the data transformation engine further comprises an integrity module for comparing a property of the data to that stored in metadata information.

According to another aspect of the invention, the data transformation engine further comprises a de-duplication module for executing a de-duplication step.

According to another aspect of the invention, the data transformation engine further comprises an overflow module for writing data to an overflow cache tier in response to a failed write operation.

According to another aspect of the invention, the method further includes providing a data store interface for providing an operational interface between the storage resources and the data transformation engine.

According to another aspect of the invention, the method further includes the step of abstracting data storage resource information such that each data storage resource appears uniformly to the data transformation engine.

According to another aspect of the invention, the method further includes the step of pooling at least two or more data storage resources.

According to another embodiment of the invention, there is provided a system for storing data for retrieval by an application running on a computer system including a tiered caching system including at least one cache tier and a base tier, wherein the data is stored in at least one of the at least one cache tier and the base tier based on a policy, and a means to organize data for presenting an application view of the data to the application, wherein the means to organize data includes metadata information for each of at least one cache tier and the base tier.

According to one aspect of this embodiment, each of the at least one cache tier and the base tier are arranged on different storage resources; and further wherein the means to organize data includes metadata information for each of the different storage resources.

According to another aspect of this embodiment, the system further includes at least one overflow tier, wherein the overflow tier is arranged on a different storage resource than each of the at least one cache tier and the base tier; and wherein the means to organize data includes metadata information for the overflow tier.

According to another aspect of this embodiment, the at least one cache tier comprises a plurality of tiered cache tiers.

According to another aspect of this embodiment, wherein the plurality of cache tiers are each provided on a solid state drive, the base tier is provided on a hard disk drive, and the overflow tier is provided on a cloud storage resource.

According to another aspect of this embodiment, the means to organize data is stored on the hard disk drive.

According to another aspect of this embodiment, the data is stored on the base tier and cached on the one or more of the plurality of cache tiers, wherein a higher level cache tier caches data on a lower level cache tier.

According to another aspect of this embodiment, each cache tier level comprises two or more storage resources.

According to another aspect of this embodiment, the means to organize data is agnostic to the particular storage devices being used.

According to another aspect of this embodiment, further comprising an intercepting system for intercepting means to organize data operations to be carried out, or otherwise processed independently of the means to organize data.

According to another aspect of this embodiment, wherein the intercepting system is adapted to dissociate input/output operations according to the policy such that at least a portion of the operations are intercepted by the intercepting system and processed according to the policy.

According to another aspect of this embodiment, the system further comprises a policy module for providing the policy.

According to another aspect of this embodiment, the policy module is integral with the intercepting system.

According to another aspect of this embodiment, the policy module is integral with the means to organize data.

According to another aspect of this embodiment, the intercepting system includes at least one of (a) a means for passing an intercepted operation to a data transformation engine provided between a storage resource and the intercepting system; (b) a means for logging the completion of an intercepted operation; and (c) a means for changing an intercepted operation and passing it on to the means to organize data.

According to another aspect of this embodiment, a data transformation engine is provided between the intercepting system and the storage resources.

According to another aspect of this embodiment, the data transformation engine further comprises a read caching module for executing a read operation to find the highest cache tier on which data exists and to retrieve the data.

According to another aspect of this embodiment, the data transformation engine further comprises a write caching module for performing write operations to different cache tier levels.

According to another aspect of this embodiment, the data transformation engine further comprises an encryption module for encrypting and decrypting data prior to the data passing through the means to organize data.

According to another aspect of this embodiment, the data transformation engine further comprises an integrity module for comparing a property of the data to that stored in metadata information.

According to another aspect of this embodiment, the data transformation engine further comprises a de-duplication module for executing a de-duplication step.

According to another aspect of this embodiment, the data transformation engine further comprises an overflow module for writing data to an overflow cache tier in response to a failed write operation.

According to another aspect of this embodiment, the system further comprises a data store interface for providing an operational interface between the storage resources and the data transformation engine.

According to another aspect of this embodiment, at least two or more data storage resources are pooled.

BRIEF DESCRIPTION OF THE DRAWINGS

Embodiments will now be described, by way of example only, with reference to the attached Figures, wherein.

DETAILED DESCRIPTION OF THE EMBODIMENTS

The invention provides a novel system and method to transparently integrate different classes of storage devices within a single filesystem to thereby realize synergistic benefits to the use of these different classes of storage devices that extend beyond the advantages of each class of storage device operating independently, and with each its own filesystem. As will become apparent to those skilled in the art, having regard to the description that follows, the invention provides a generalized caching system and method that can cache any class of storage device on any other class of storage device, and optionally provide such caching in an integrated manner among multiple classes and types of storage devices. While the invention is described with respect to a filesystem for ease of understanding, it will be appreciated that any means for organizing data may be used, including but not limited to databases and in particular object databases, key value stores, some network protocols and some shared data systems.

In implementing the above-noted functions, the applicant is faced with the following problems: (a) How to transparently integrate different storage devices so that the storage user experiences the benefits herein described, without requiring a change to their applications or operating systems; (b) How to be agnostic to the choice of storage device among the many options available, so that the invention can be implemented as new technologies arise; (c) How to provide security and integrity of storage devices on a general level; and, (d) How to deal with latency issues for storage devices that are slow or remote. The following is a brief, top-level description of how these issues were solved to result in the invention. A more detailed description of putting the invention into practice will follow thereafter.

Figure 2:
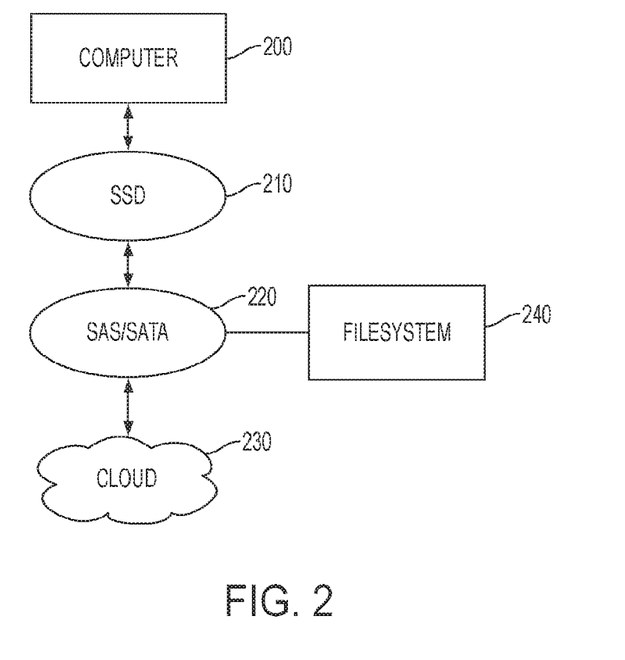
FIG. 2 shows a storage model according to the invention.

It was discovered that the transparent integration problem could be solved by retaining the existing user-visible organization of a primary data storage system (such as filesystem metadata in a filesystem), and having the data placement onto the same or other storage devices controlled independently. This changes the data flow and organization of the prior art systems as shown in FIG. 1 to that as shown in FIG. 2, where according to the invention, each layer or tier of storage is a front end for lower layers.

Regarding the agnosticity problem, it was discovered that using each storage device in the system as a generic data storage resource, and abstracting away the underlying storage mechanisms to provide a uniform interface for all devices allowed for each class of storage device to appear the same, and thus be treated agnostically, while still retaining the inherent physical advantages available from the particular class of storage device.

The security and integrity problem was resolved by providing a policy-based processing of all data passing through the system, including data is stored somewhere beyond the user's/owner's control, as might be the case with cloud storage. Furthermore, this is another advantage of providing a uniform interface for all devices so they can be treated agnostically, and thus at the same time have the data thereon be subject to the policy-based processing irrespective of the storage device class, or particular storage device on which the data resides.

The latency issues are resolved by using a transparent integration for multiple storage devices to provide a cache cascade of storage tiers to optimize performance. That is, rules may be applied so that the physical characteristics of particular classes of data storage may be accounted for when determining on which class the data is stored. Alternatively, a system-level design may be applied at the outset so that higher levels of the tier are provided with faster storage classes.

Figure 8:
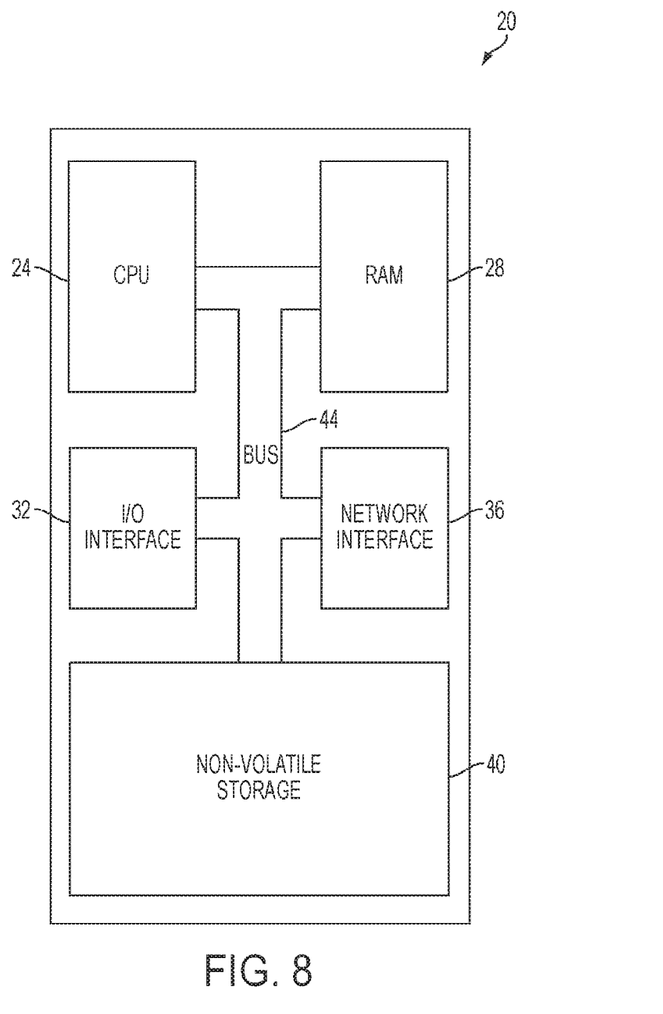
FIG. 8 shows a generalized computer system on which the invention may be implemented.

The invention generally operates within the context of a computer system, and serves to provide an improvement to the data storage capabilities available to general known computer systems, an exemplary one of which is shown in FIG. 8. As shown, the computer system 20 has a number of physical and logical components, including a central processing unit ("CPU") 24, random access memory ("RAM") 28, an input/output ("I/O") interface 32, a network interface 36, non-volatile storage 40, and a local bus 44 enabling the CPU 24 to communicate with the other components. The CPU 24 executes an operating system and a number of software systems. RAM 28 provides relatively-responsive volatile storage to the CPU 24. The I/O interface 32 allows for input to be received from one or more devices, such as a keyboard, a mouse, etc., and outputs information to output devices, such as a display and/or speakers. The network interface 36 permits communication with other systems. Non-volatile storage 40 stores the operating system and programs. During operation of the computer system 20, the operating system, the programs and the data may be retrieved from the non-volatile storage 40 and placed in RAM 28 to facilitate execution.

The example of FIG. 2 shows one top-level implementation of the invention, in which a computer system 200 accesses data from a tiered cache structure, where the cache structure includes a cache tier 210 implemented with an SSD, a base tier 220 implemented with a regular hard drive, and an overflow tier 230, implemented with a cloud storage service. As shown, the filesystem 240 may still reside on the base tier 220, that is, on the hard disk drive, where it ordinarily resides in known computer systems.

Figure 3:
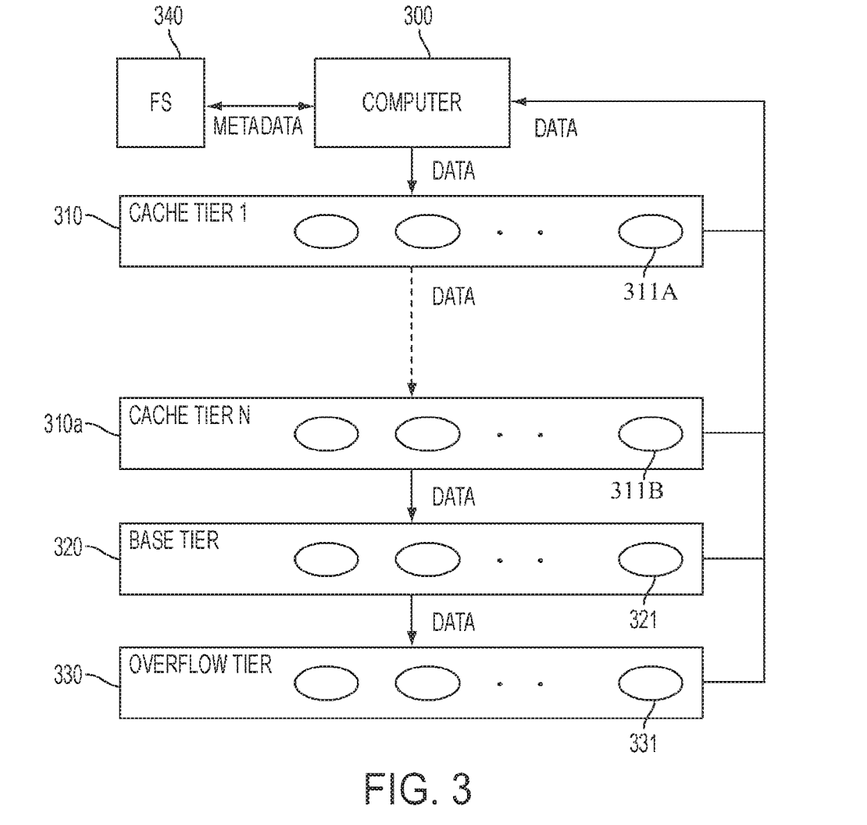
FIG. 3 shows the general storage tiering model according to one embodiment of the invention.

Referring now to FIG. 3, there is shown a top-level data flow model according to the invention. The filesystem 340 is an extension of the data storage system and may be located on any of the storage devices accessible by the computer 300. A series of cache tiers 310 are shown, as is one base tier 320 and an overflow tier 330. Each of the cache tiers may comprise any number of storage resources 311A, 311B, 321 and 331, respectively, within the respective tier as shown. According to the invention, higher levels of tiers cache data from other tiers lower in the stack. On the cache tiers 310, there is a hierarchy such that a higher level cache tier 310 caches data from a cache tier on a lower level 310a. The base tier 320 is the hard source of the data and the storage is completed at this level. The overflow tier 330 is where data is place in the event the base tier 320 is full.

In general, there are one or more cache tiers 310, a single base tier 320 and the overflow tier 330 is optionally provided, although there may be a plurality of overflow tiers 330. Any class of data storage device may be used, and may be used for more than one tier. The particular classes of storage used on each tier are preferably those as illustrated in FIG. 2, but other classes of storage are also contemplated. For example, the plurality of cache tiers may be implemented on an operating system file buffer cache that is preferably used in conjunction with the operating system. In this example, the invention cooperates with the operating system, in using the file buffer cache, but the file buffer is not used as an exclusive resource. That is, while caching below the file buffer cache would implicitly use the file buffer cache, the invention contemplates more than this, where there is explicit control over whether something goes into the file buffer cache or not, and operates in a manner beyond the typical use of the file buffer cache in existing systems.

The invention also allows for the filesystem 340 metadata to be stored on any storage resource, including one that is also used for other purposes. In practice, all data would move through the computer system 300 as it is being arranged or moved from one tier to the next. That is, the computer system 300 is responsible for transferring data between the tier cache levels of the invention, based on instructions thereon for executing the invention and on the filesystem 340 metadata.

Figure 4:
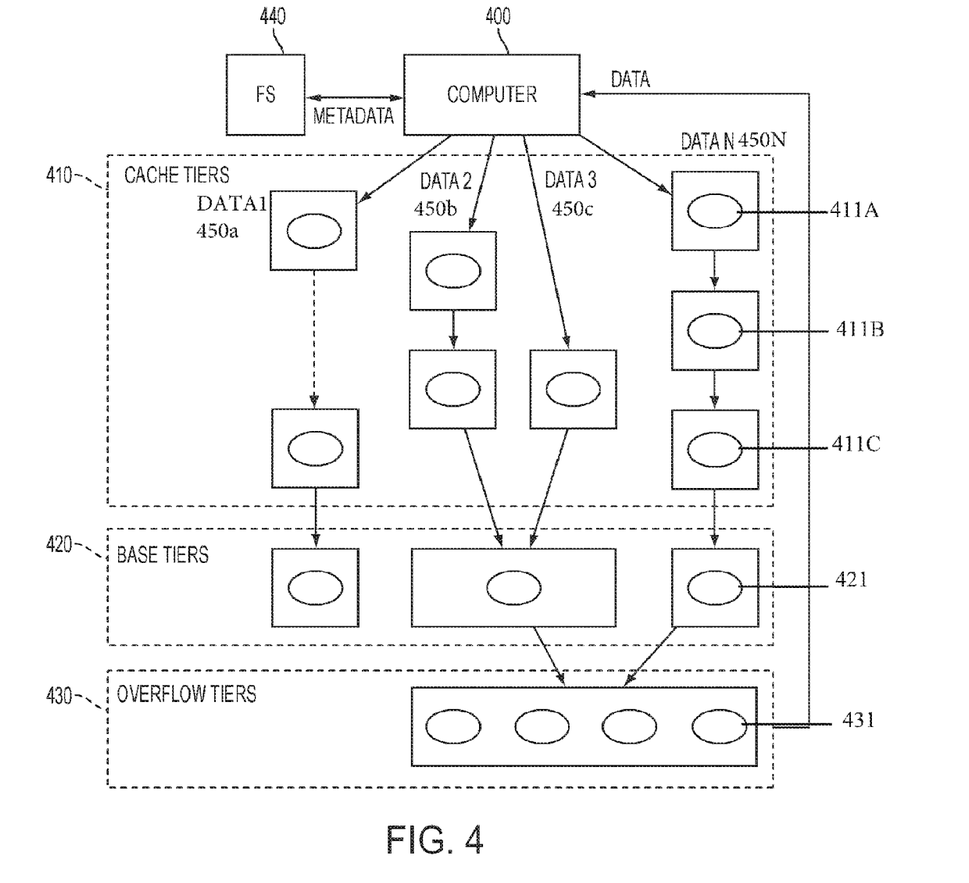
FIG. 4 shows a refined version of the storage model of FIG. 3.

While FIG. 3 shows a particular top-level implementation of the invention, the data shown in FIG. 3 is of a single type. Referring to FIG. 4, there is shown a generalized implementation of the invention incorporating a plurality of types of data 450a, 450b, 450c, and 450n. For example, data type 450a exists on two cache tiers, 410a and 410b, and on the base tier 420. Data types 450b and 450c exist on different cache tiers, but on the same base and over tier. Storage resources 411A, 411B, 411C, 421 and 431 exist on the cache tiers 410, the base tier 420 and the overflow tier 430, respectively. As will be appreciated by a person skilled in the art, the invention contemplates any type of data being stored on any of the cache tiers and on any particular type of storage resource, as illustrated by the generalized case of FIG. 4. For each kind of data as determined by a policy as will be described below, a tiering stack exists with all cache tiers and overflow tiers option and only base tiers required. The data flows through its tiering stack in order. The same storage resource may appear in multiple tiering stacks without conflict due to the data separation features explicitly in the namespace of the storage resource or implicitly due to the naming algorithm for stored data. Details of the implementation of these features are described below. As will be appreciated by a person skilled in the art, the invention provides a novel paradigm by which data can be managed and stored across multiple classes of storage resources.

While FIGS. 3 and 4 have been described as including storage resources, these may also be data storage systems incorporating other organizational information on top of the physical resource itself. The invention also provides for a structure to the organization of the storage resources on each tier. Each storage resource in FIGS. 3 and 4 may also be organized as a data storage tree. If a particular node in the tree is a leaf, then it is a data storage resource with a uniform interface at some level of the implementation of the invention. If a particular node is an interior node, and storing data for this node is representative of storing data for a minimum number of its child nodes. Accordingly, an interior node of such a storage tree is a top storage layer of that particular branch and appears to the filesystem as a single storage resource that includes semantics for managing the leaf storage resources stemming from the internal node. Furthermore, the invention contemplates support for multiple forms of data storage systems or storage resources including raw block storage (such as a disk device), filesystems and key value stores. Each of these storage resources may also have a complex structure and include blocks from separate disks, for example, but a uniform output to the filesystem 340, 440 of the invention is presented for implementing the invention, and subsequently for providing a view to a using application or operating system that is agnostic to such underlying details of the storage resource. Details of the implementation of these features will become apparent having regard to the description below.

In summary, the invention has the following, non-limiting, individually unique features:
a) it uses a general cache tiering storage model where each (policy determined) category of data has its own stack of tiers
b) it is agnostic to the particular storage devices being used
c) it is transparent to the user in that it can be created as an extension of an existing data storage system (e.g. a filesystem)
d) it is based on the user-visible organization of the data storage system, not the underlying implementation, so for example for filesystems it is file based, not block based
e) it can be deployed as an added facility of an existing operating system installation or packaged as a network appliance Furthermore the invention is able to provide these features for data storage systems other than filesystems that provide higher level abstractions above the actual storage resource as their primary interface, for example databases and in particular object databases, key value stores, some network protocols and some shared data systems.

Figure 5:
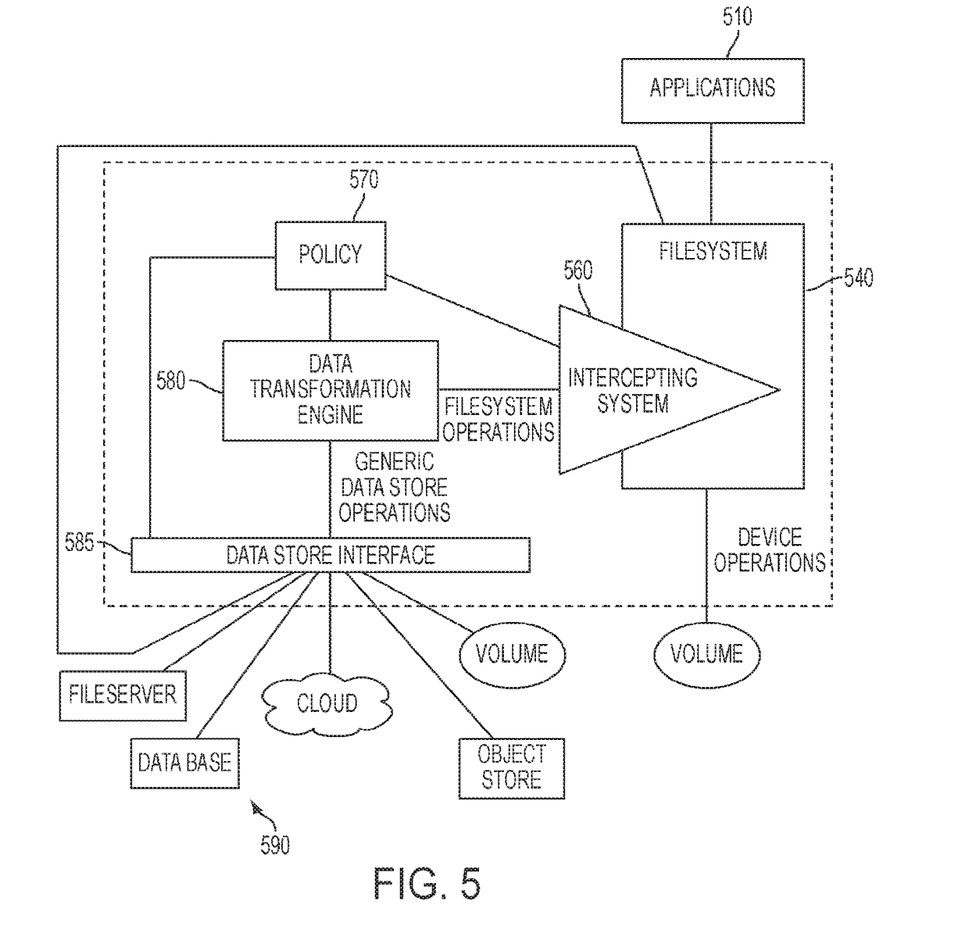
FIG. 5 shows a block diagram according to one implementation of the invention.

Having now described the advantages and top level details of results of the invention, preferred systems and methods for enabling a person skilled in the art to put the invention into practice will now be described, with particular reference to FIG. 5, where there is shown a preferred embodiment of the invention. In FIG. 5, there is shown a filesystem 540 presenting an interface to applications 510 on a computer system, and in communication with an intercepting system 560. The intercepting system 560 acts upon instructions from a policy module 570 to intercept data moving between the various data storage devices 590 used in providing the cache tiered storage system according to the invention. A data transformation engine 580 and a data store interface 585 are provided to process data, as outlined below, prior to executing operations on the data by either the intercepting system 560 or the filesystem 540.

The Filesystem

The invention requires the use of a filesystem 540. Filesystems 540, their general nature and functions are known in the art to be an interface between operating systems/applications and data storage systems. The filesystem 540 preferably presents a filesystem interface to applications that applications are able to use without being modified. In this manner, the filesystem 540 may be a new type of filesystem taking advantage of, and using the teachings of the invention in an optimized manner, it could be a modified version of an existing filesystem, or it could be an extended version of an existing filesystem. In each case, the full filesystem functionality is retained so that data can be stored in the filesystem, but filesystem operations matching a selection policy are processed differently than prior art filesystem operations by redirecting them to a module, termed an intercepting system 560. In the case of extending an existing filesystem, one particular system and method for implementing this redirection to an intercepting system 560 is disclosed in applicant's co-pending PCT application number PCT/CA2011/050514, entitled, "System and Method For Extending Data Storage System Functions", the contents of which are herein incorporated by reference.

For data storage systems that do not provide a filesystem interface, the invention would provide the preferred interface of that data storage system and the same principles would apply in a similar manner to modifying the data flow for other data storage systems as is done for filesystems.

The Intercepting System

In order to extend normal filesystem functionality with the implementation of added functionality of the invention, an intercepting system 560 is provided. Intercepting system 560 is adapted to intercept filesystem operations appropriately and to allow these operations to be processed transparently outside of the filesystem itself. Optionally, the intercepting system 560 may be an extension of the filesystem itself, or the intercepting system 560 could be provided by making use of built in operating system functionality, or it could be provided in other ways, for example through commercial products currently available in the art. The invention is not limited to particular implementations of the intercepting system 560.

For the purposes of the invention, the intercepting system 560 is provided to dissociate the input/output operations in the data storage system according to a policy, such that one set of operations proceed as normal for the data storage system, and another set are interpreted according to the policy by the intercepting system. In this way, the data storage system retains its original functionality allowing (a) the actions of the intercepting system 560 to be generally transparent to users of the data storage system because its semantics are retained; (b) the semantics of the data storage system to be extended by the intercepting system; and, (c) the data storage system itself to be usable as a resource by the intercepting system in implementing its policy.

The invention contemplates variations and deviations from the above functionality, without departing from the general nature and teachings of the invention. For example, in the case of implementing a policy that includes data to appear differently depending on context (data polymorphism), the semantics of the data storage system may not be retained, and may be overwritten by the intercepting system. This is also one way of extending the filesystem semantics as per (b), above.

With respect to (c), above, it is contemplated that the policy could specify that certain files should be encrypted but otherwise stored in the same way on the same filesystem as they otherwise would be, or that the intercepting system could maintain a database on the filesystem so as to assist in its work or that the filesystem could remain responsible for all metadata, and the intercepting system could take over responsibility for some or all data, as is the case in the preferred embodiment of the invention.

Accordingly, the intercepting system 560 provides the interface between the underlying structure of the tiered cache storage and the filesystem 540 that is presented at the application level. It should be noted that the filesystem itself could be a complex compound filesystem, for example, so as to allow the metadata to be physically distributed with the filesystem providing distributed cache and lock management to ensure data integrity.

With an intercepting system as described, the user-visible organization of the data storage system is clearly unchanged no matter how the intercepting system decides to place data. This is one solution to the problem of providing transparent integration of different storage devices, as previously discussed. However, given the differing characteristics and classes of storage devices, the user experience is also influenced by the performance characteristics of the choices of data placement that could be made by the intercepting system. The typical way of solving this issue is with caching, and given the ability of an intercepting system to place data anywhere, the invention applies a cache tiering storage model, as described above, to aid in the optimization of performance for users and their applications.

The Policy

The invention also provides a policy module 570, or alternatively, the policy may be built into the intercepting system or provided as an extension of the filesystem. The policy, and its execution, preferably dictates the operation of all other major modules of the invention. The policy module preferably encompasses a policy storage function, and a user interface function.

In general, a policy is a context pattern associated with actions, or particular rules through which the storage and processing of data is executed. For example, a policy could provide that for any file having an ".avi" extension, and is larger than 1 megabyte, do not buffer the file through the kernel file cache, or for any user "Joe" accessing file data outside of allowed work hours, do not execute the operation, or always replicate new data to the data store named "offsite storage", or if there is insufficient space for this operation to complete, use storage on "cloudstorage." These examples are provided merely to illustrate a wide variety of rules that may be applied through policy. Various other policies may be implemented by the policy module 570 in applying the teachings of the invention.

Optionally, there may be provided a user interface to communicate these policies to the policy module 570. This could, for example, be an application that is run upon first integrating the tiered cache according to the invention with an existing computer system, or alternatively, could be an application accessible to administrators of the invention. With regards to the policy module 570, a pattern is defined as an observation, requested action or state of data in response to which the policy module 570 executes an action, or arranges for the execution of an action by any other elements of the invention. The interaction with the policy module 570 with each of the other elements of the invention is described below.

Policy, by way of the policy module 570 controls which filesystem operations the intercepting system 540 will intercept, and what to do with them once intercepted. Interception is controlled by matching a context pattern, as context is available to the intercepting system 540. Context is more broadly defined herein as any information the filesystem has available to it regarding a particular operation initiated by an application. Examples of this information include, but are not limited to (a) the identity of the process requesting the operation, (b) the identity of the owner of the process requesting the operation, (c) the name of the file involved, (d) the operation requested, (d) the parameters of the operation requested, (e) the individual attributes of the file involved in the operation including, but not limited to, size, creation date/time, last modification time, (f) general context information such as date and time, system state, system resource usage, etc., (g) whether the application is local or remote, and (h) whether the file is local or remote. The description refers interchangeable to the policy and the policy module. In practice, the policy is any set of instructions that is carried out, or conveyed, by the policy module.

The intercepting system 540, in response to adapting policy from the policy module 570 may take one of three actions: (i) pass the intercepted operation to the data transformation engine 580 and wait to be told by the data transformation engine what to convey to the filesystem; (ii) note that the intercepted operation occurred (perhaps as part of a state change or a logging function); and, (iii) change the intercepted operation and pass it on immediately within the filesystem. The policy module 570 is adapted to instruct the intercepting system 540 what to do once it recognizes a specific context pattern.

The policy module contains the rules implementing the tiered cache model described above to adaptively store data in different cache tiers on different storage resources as described above.

The Data Transformation Engine

Policy determines exactly how each intercepted operation is processed given a set of functional modules that preferably form a part of, or are in communication with the data transformation engine 580. Optionally, the policy also provides parameters for the functional modules so that the same action can be performed in different specific ways based on context. The data transformation engine 580 is preferably responsible for executing policy outside of the operational flow of the filesystem. A data store interface 585, details of which are described below, provides an interface between the data transformation engine 580 and the data storage resources used in providing the tiered cache organization of the invention.

According to the invention, the policy module associates a data store label as used by the data transformation engine 580 with an algorithm used to carry out input/output operations given that data store label.

The data transformation engine 580 preferably includes a number of functional modules assembled for each policy action into a set of processing instructions. A simple action could be represented by a primitive set of functional modules arranged with 1 input and 1 output for each functional module. Thus, the simplest type of data transformation engine 580 would have a fixed policy and therefore use functional modules that have fixed connections to each other, each with one input and one output. In practice, functional modules must actually be able to perform operations both before and after lower level modules execute, so a conceptual single input single output module in fact has 2 inputs and 2 outputs to allow for, for example, iterative interactions between each functional module within the data transformation engine 580.

The role of the data transformation engine 580 is to send an intercepted operation through this processing flow, and return information to the intercepting system 540 so that the intercepting system 540 can properly fulfill its responsibility to process intercepted operations transparently to the filesystem and the applications that use it. The functional modules are created to provide the specific visible functionality of the invention. With specific regards to the invention, the functional modules relate specifically to the cache tiering model, but other functional modules can also be implemented at this level to provide additional functionality.

Figure 9:
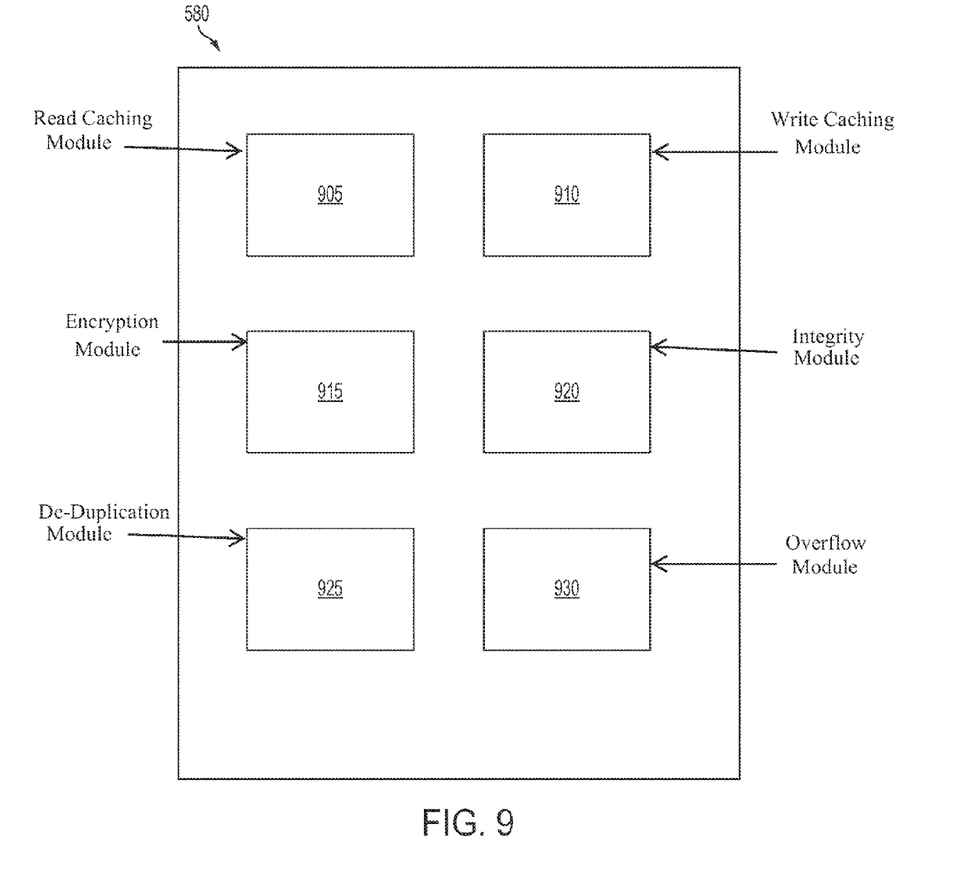
FIG. 9 shows a representative data transformation engine for use with the invention.

With reference to FIG. 9, the following modules are preferably provided for implementing the cache tiering according to the invention.

A read caching module 905 may be provided for executing a read operation to find the highest cache tier on which data exists and to retrieve the data. If the data is not cached at the highest tier, the read caching module 805 may queue a write operation, to be executed by the write caching module, to the highest cache tier for this particular data.

A write caching module 910 may be provided to perform write operations, for example to write the data to the highest cache tier and to queue a write to the next level down the cache tier, or to the base tier. The data store rules, with respect to particular data being stored on different cache levels are preferably dictated by policy.

An encryption module 915 may be provided to encrypt data for a write operation and to decrypt data for a read operation. The method or type of encryption is not limited by the invention, and thus any type of encryption module and/or method may be used.

An integrity module 920 may be provided to calculate a content hash or checksum on the data and compare it to the value stored in metadata and to take appropriate action on error for a read operation, or alternatively, for a write operation to calculate a content hash or checksum on the data and store the value in metadata.

A de-duplication module 925 may be provided such that upon executing a write operation, if the write is proceeding to a data store that is so designated (e.g. cloud storage) then to de-duplicate the write—i.e. only write the data if it does not already exist on the data store.

An overflow module 930 may be provided such that upon observation of a failed write to insufficient data space on a storage resource, to redirect the write operation to a different storage resource. In the case of the invention, this is preferably a redirection to the overflow tier.

It will be understood by those skilled in the art that each of these modules are parameterized by the active policy, for example in the specific choice of content hash or checksum, in the alternate data store for overflow, in the choice of encryption mechanism, and so on. The details of the policy are not limited by the invention, but rather, the arrangement of such modules in the context of the tiered cache system herein defined. Furthermore, these modules may be provided with helper processes and/or threads that execute operations such as completing queued writes, maintaining caches, and performing preemptive or predictive calculation. The functional modules may also have access to their own shared metadata regarding the operations and data flowing through them, and this metadata could be stored in the filesystem or in a database or some other shared data structure.

The functional modules are also able to use the intercepting system to affect the operation flow through the filesystem. For example, the encryption module may operate by simply requesting the filesystem perform its default encryption action on the data passing through. Other functions are possible with this architecture, including replication, compression, versioning, name virtualization, general data virtualization, data polymorphism, and many others.

The Data Store Interface

Data store interface 585 is provided to preferably execute two primary operations in acting as an operational interface between the data transformation engine 580 and the underlying storage resources used on the different tiered cache levels as herein described.

First, the data store interface 585 carries out abstraction functionality such that each of the data storage resources appears uniformly to the data transformation engine. Next, the data store interface provides pooling functionality to translate the input/output operations as requested by the data transformation engine 580 into compound operations as dictated by the policy.

The abstraction of data storage mechanisms is a way of dealing with many fundamentally similar but specifically different data storage systems or storage resources so as to simplify the logic of elements using the storage resources, in this case, the data transformation engine 580 and its functional modules While various methods of implementing the abstraction process are possible, according to the preferred embodiment, the basic storage abstraction model is the key-value store. A specific piece of data is stored with a specific key (name, or label), so that it can be retrieved by providing the same key to the data store. For example a data block stored on a disk is stored at a particular location (its key), and later retrieved in the same way or by using other semantics of disks (that keys form a contiguous space and data blocks of different size overlap in this key space). Another example is cloud storage, which typically presents a basic key-value store interface. Because the invention supports filesystems as data stores, and in filesystems there is the ability to specify a subset of a previously stored value, the preferred embodiment of the invention uses a file interface model as the abstraction presented to the data transformation engine 580. In this abstraction, a specific piece of data is stored with a specific key and position (and implicitly size of the data), and for each key the typical file (or disk, as in the above example) semantics apply with respect to position information and overlapping data. This allows simple integration of filesystems into the abstraction, but maps easily to a key-value store abstraction one layer down in the implementation which makes it correspondingly easy to integrate cloud storage and other similar key-value stores.

As the invention is assigned data storage systems or storage resources to use, it is useful to be able to create compound data stores making use of multiple more primitive data storage systems or storage resources. A very widespread example of such compound storage resources are RAID arrays, which aggregate a number of primitive independent disks into a single compound virtual disk. The invention accomplishes this through a storage resource pooling mechanism.

In the invention, data storage systems and storage resources are classed (what kind of storage is it, how to communicate with it), parameterized (use only this much of it, in this place on it, with these credentials), and labelled (and give it this name: " . . . ."). These may be defaulted so what is exposed in the user interface need not be at that level of completeness. The invention allows, but does not require, the creation of pooled storage which is defined by policy in terms of a non-zero set of other data storage systems, storage resources, or other pooled storage, and a number which is the minimum number of the elements of the set that must confirm a write operation before it is considered persisted, what is referred to herein as the replication number.

Figure 6:
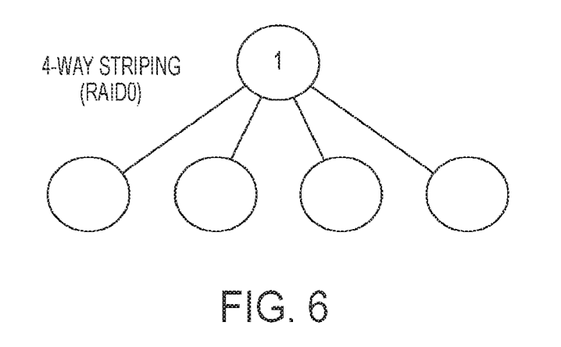
FIG. 6 shows an example of a min-OR storage tree used as a compound storage resource, emulating a 4-way RAID0 configuration.
Figure 7:
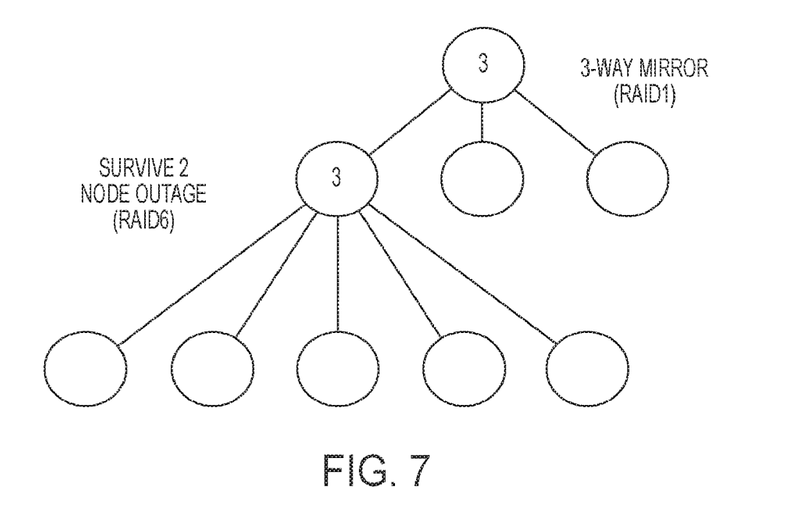
FIG. 7 shows an example min-OR storage tree used as a compound storage resource, showing a more complex 3-way RAID1 mirroring with one of the mirrors being a RAID6 equivalent configuration.

This structure is referred to as a min-OR tree. FIG. 6 and FIG. 7 illustrate min-OR trees with the replication number (relevant to interior nodes only) shown within the node. Such structures can be used to express a number of data storage and data redundancy policies similar to what has traditionally been done using RAID levels. For example, the structure in FIG. 6 is similar to a 4-way RAID0 configuration in that a write operation at the root node succeeds when a write to any one of the child nodes succeeds. Three qualitatively different semantics for data placement in child nodes is contemplated by the invention to fulfill the replication number requirement:

Random placement: the data is placed essentially at random on the child nodes.

Ordered placement: the data is placed on an ordered sequence of nodes (for example "leftmost"), which is a way of providing overflow protection.

Algorithmic placement: the data is placed according to an algorithm that makes use of external information to optimize certain operations or parameters, for example packing (trying to fill nodes). wear-levelling (trying to keep all nodes at the same fill level), load-aware (trying to keep all nodes equally busy), high-availability (trying to maximize availability/cost function), energy (trying to minimize energy usage), affinity (trying to use nodes "close" to something), server (trying to use nodes attached to preferred servers), and topology (trying to use nodes near each other).

Another example is the one illustrated in FIG. 7 which shows a configuration involving two levels, of which the top level acts as a 3-way RAID1 mirror (in a real situation this might correspond to "write everything to my fast local storage, my slow site archive, and the remote corporate cloud archive)", and one of the child nodes is itself a redundant configuration created using replication as in "write to any 3 of these 5 nodes", which creates survivability in case 2 nodes fail (which meets the standard for being called RAID6).

The invention may support any number of levels of this structure, including none (i.e. just simple storage resources), and each node of the structure can independently be a complex data storage system or storage resource.

Since redundancy is provided by replication, removing an active node consists of ensuring that the replication policy of a parent node is maintained by copying data appropriately between child nodes. There thus exists separately maintained metadata with a record of where data is stored to help accomplish all operations on the min-OR storage tree. If the replication number is 1, removing a child node cannot be done non-destructively without notice, but with notice the data that is unique to the child can be copied off to other nodes prior to removal or failure. Notice the semantics are defined such that the data must exist at least the replication number of times on different child nodes, but a higher degree of replication is always allowed.

The storage structures created in this way are different from traditional RAID implementations (though not definitions) by not maintaining sector correspondence (in case of RAID1), by not using parity for redundancy (in case of RAID6), and by not using fixed blocks for striping (in case of RAID0), however the functionality is adapted for carrying out the invention.

This preferred pooling mechanism is useful because it provides a powerful and consistent replication model, is functionally equivalent to a number of traditional RAID levels, allows for easy expression of complicated storage policies, and allows for the simple management of large pools of storage resources.

For example, one could fill a rack with disks, declare them all for use as a storage resource within a tier according to the invention, and specify the desired redundancy level ("survive simultaneous failure of 3 disks") which sets the replication number (to 4 in the example), and the data storage interface would manage storing and retrieving data for the data transformation engine according to this policy.

At the opposite end of the spectrum, a trivial min-OR tree is a single primitive node such as a disk or filesystem. It is possible to extend the pooling concept by extending min-OR trees to exactly simulate traditional RAID implementations (by adding a minimum-parity replication parameter to interior nodes), or other content dispersion methods (e.g. by adding a replication type parameter such as "reed-Solomon dispersal").

Various modifications to the invention are contemplated without departing from the spirit and scope of the invention which is defined in the claims that follow. While various steps and computer components have been herein used, these are to be given their ordinary definition as would be known in the art, unless explicitly limited or otherwise herein defined.

The above-described embodiments are intended to be examples of the present invention and alterations and modifications may be effected thereto, by those of skill in the art, without departing from the scope of the invention that is defined solely by the claims appended hereto.

What is claimed is:

1. A method comprising:
    integrating a cache tier, a base tier, and an overflow tier into a tiered caching system, wherein said cache, base, and overflow tiers are arranged on different storage resources, wherein the tiered caching system is offered as an added facility to or an extension of an existing data storage system, wherein the tiered caching system includes a plurality of caches that are transparently integrated such that storage and organization of data is independent of and unknown to one or more storage devices associated with the tiered caching system and that a class or type of storage device is cached on other classes or types of storage devices, wherein integrating is based on abstraction of the tiered caching system such that the storage and organization of the data remains independent and unknown through a uniform interface such that each class or type of the one or more storage devices appears the same, wherein the abstraction is based on one or more abstraction models including a key-value store model such that multiple portions of the data are accessed from one or more of the cache, base, and overflow tiers using a specific identification including one or more of a specific name, a specific label, a specific position, and a specific size associated with the multiple portions of the data;
    storing said data in at least one of said at least one cache tier and said base tier based on a policy; and
    presenting an application view of said data to an application, wherein the application is further provided metadata information for each of at least one cache tier and said base tier.

2. The method of claim 1, wherein said overflow tier is arranged on a different storage resource than each of said cache tier and said base tier.

3. The method of claim 1, wherein said cache tier comprises a plurality of tiered cache tiers.

4. The method of claim 3, wherein said plurality of cache tiers are each provided on a solid state drive, said base tier is provided on a hard disk drive, and said overflow tier is provided on a cloud storage resource.

5. The method of claim 4, further comprising storing said data on said base tier and caching said data on one or more of said plurality of cache tiers, wherein a higher level cache tier caches data on a lower level cache tier.

6. The method of claim 5, wherein each cache tier level comprises two or more storage resources.

7. The method of claim 1, further comprising:
    passing an intercepted operation to a data transformation engine provided between a storage resource and a intercepting system;
    logging the completion of an intercepted operation; and
    changing the intercepted operation and passing it on to organize the data.

8. The method of claim 7, wherein said data transformation engine further comprises:
    a read caching module for executing a read operation to find a highest cache tier on which the data exists and to retrieve said data;
    a write caching module for performing write operations to different cache tier levels;
    an encryption module for encrypting and decrypting the data prior to said data passing through to organize said data;
    an integrity module for comparing a property of said data to that stored in the metadata information;
    a de-duplication module for executing a de-duplication process; and
    an overflow module for writing data to an overflow cache tier in response to a failed write operation.

9. The method of claim 7, further comprising providing a data store interface for providing an operational interface between said storage resources and said data transformation engine.

10. The method of claim 9, further comprising abstracting data storage resource information such that each data storage resource appears uniformly to said data transformation engine.

11. The method of claim 9, further comprising pooling at least two or more data storage resources.

12. The method of claim 8, wherein said data is organized based on one or more of object databases, key value stores, network protocols, and shared data systems.

13. An apparatus comprising:
a processing device coupled with a storage device, wherein the processing device is configured to:
facilitate integration of a cache tier, a base tier, and an overflow tier into a tiered caching system, wherein said cache, base, and overflow tiers are arranged on different storage resources, wherein the tiered caching system is offered as an added facility to or an extension of an existing data storage system, wherein the tiered caching system includes a plurality of caches that are transparently integrated such that storage and organization of data is independent of and unknown to one or more storage devices associated with the tiered caching system and that a class or type of storage device is cached on other classes or types of storage devices, wherein integrating is based on abstraction of the tiered caching system such that the storage and organization of the data remains independent and unknown through a uniform interface such that each class or type of the one or more storage devices appears the same, wherein the abstraction is based on one or more abstraction models including a key-value store model such that multiple portions of the data are accessed from one or more of the cache, base, and overflow tiers using a specific identification including one or more of a specific name, a specific label, a specific position, and a specific size associated with the multiple portions of the data;
facilitate storing of said data in at least one of said cache tier and said base tier based on a policy; and
present an application view of said data to an application, wherein the application is further provided metadata information for each of at least said cache tier and said base tier.

14. The apparatus of claim 13, wherein said overflow tier is arranged on a different storage resource than each of said cache tier and said base tier.

15. The apparatus of claim 13, wherein said cache tier comprises a plurality of tiered cache tiers.

16. The apparatus of claim 15, wherein said plurality of cache tiers are each provided on a solid state drive, said base tier is provided on a hard disk drive, and said overflow tier is provided on a cloud storage resource.

17. The apparatus of claim 16, wherein the processing device is further to facilitate storing of said data on said base tier and caching said data on one or more of said plurality of cache tiers, wherein a higher level cache tier caches data on a lower level cache tier.

18. The apparatus of claim 16, wherein each cache tier level comprises two or more storage resources.

19. The apparatus of claim 13, wherein the processing device is further to:
pass an intercepted operation to a data transformation engine provided between a storage resource and a intercepting system;
log the completion of an intercepted operation; and
change the intercepted operation and passing it on to organize the data.

20. The apparatus of claim 19, wherein said data transformation engine further comprises:
a read caching module for executing a read operation to find a highest cache tier on which the data exists and to retrieve said data;
a write caching module for performing write operations to different cache tier levels;
an encryption module for encrypting and decrypting the data prior to said data passing through to organize said data;
an integrity module for comparing a property of said data to that stored in the metadata information;
a de-duplication module for executing a de-duplication process; and
an overflow module for writing data to an overflow cache tier in response to a failed write operation.

21. The apparatus of claim 19, wherein the processing device is further to facilitate providing of a data store interface for providing an operational interface between said storage resources and said data transformation engine.

22. The apparatus of claim 21, wherein the processing device is further to abstract data storage resource information such that each data storage resource appears uniformly to said data transformation engine.

23. The apparatus of claim 21, wherein the processing device is further to pool at least two or more data storage resources.

24. The apparatus of claim 20, wherein said data is organized based on one or more of object databases, key value stores, network protocols, and shared data systems.

25. At least one non-transitory machine-readable medium comprising instructions which, when executed by a computing device, cause the computing device to:
integrate a cache tier and a base tier, and an overflow tier into a tiered caching system, wherein said cache, base, and overflow tiers are arranged on different storage resources, wherein the tiered caching system is offered as an added facility to or an extension of an existing data storage system, wherein the tiered caching system includes a plurality of caches that are transparently integrated such that storage and organization of data is independent of and unknown to one or more storage devices associated with the tiered caching system and that a class or type of storage device is cached on other classes or types of storage devices, wherein integrating is based on abstraction of the tiered caching system such that the storage and organization of the data remains independent and unknown through a uniform interface such that each class or type of the one or more storage devices appears the same, wherein the abstraction is based on one or more abstraction models including a key-value store model such that multiple portions of the data are accessed from one or more of the cache, base, and overflow tiers using a specific identification including one or more of a specific name, a specific label, a specific position, and a specific size associated with the multiple portions of the data;
store data in at least one of said cache tier and said base tier based on a policy; and
present an application view of said data to an application, wherein the application is further provided metadata information for each of at least said cache tier and said base tier.

26. The non-transitory machine-readable medium of claim 25, wherein said overflow tier is arranged on a different storage resource than each of said cache tier and said base tier.

27. The non-transitory machine-readable medium of claim 25, wherein said cache tier comprises a plurality of tiered cache tiers.

28. The non-transitory machine-readable medium of claim 27, wherein said plurality of cache tiers are each provided on a solid state drive, said base tier is provided on a hard disk drive, and said overflow tier is provided on a cloud storage resource.

29. The non-transitory machine-readable medium of claim 25, wherein the processing device is further to facilitate storing of said data on said base tier and caching said data on one or more of said plurality of cache tiers, wherein a higher level cache tier caches data on a lower level cache tier.

30. The non-transitory machine-readable medium of claim 29, wherein each cache tier level comprises two or more storage resources.

31. The non-transitory machine-readable medium of claim 25, wherein the processing device is further to:
   pass an intercepted operation to a data transformation engine provided between a storage resource and a intercepting system;
   log the completion of an intercepted operation; and
   change the intercepted operation and passing it on to organize the data.

32. The non-transitory machine-readable medium of claim 31, wherein said data transformation engine further comprises:
   a read caching module for executing a read operation to find a highest cache tier on which the data exists and to retrieve said data;
   a write caching module for performing write operations to different cache tier levels;
   an encryption module for encrypting and decrypting the data prior to said data passing through to organize said data;
   an integrity module for comparing a property of said data to that stored in the metadata information;
   a de-duplication module for executing a de-duplication process; and
   an overflow module for writing data to an overflow cache tier in response to a failed write operation.

33. The non-transitory machine-readable medium of claim 31, wherein the processing device is further to facilitate providing of a data store interface for providing an operational interface between said storage resources and said data transformation engine.

34. The non-transitory machine-readable medium of claim 33, wherein the processing device is further to abstract data storage resource information such that each data storage resource appears uniformly to said data transformation engine.

35. The non-transitory machine-readable medium of claim 33, wherein the processing device is further to pool at least two or more data storage resources.

36. The non-transitory machine-readable medium of claim 32, wherein said data is organized based on one or more of object databases, key value stores, network protocols, and shared data systems.

* * * * *